Jan. 19, 1971    E. A. GLASSEY    3,555,903
INSTRUMENT FOR GAUGING LIQUID DEPTH, AND THE LIKE
Filed Aug. 4, 1969    2 Sheets-Sheet 1

Jan. 19, 1971     E. A. GLASSEY     3,555,903
INSTRUMENT FOR GAUGING LIQUID DEPTH, AND THE LIKE
Filed Aug. 4, 1969     2 Sheets-Sheet 2
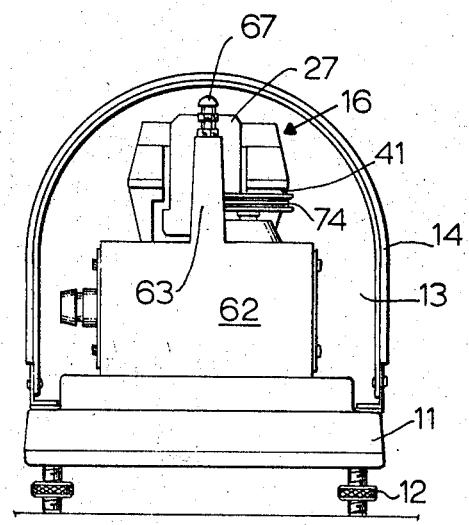
FIG. 3
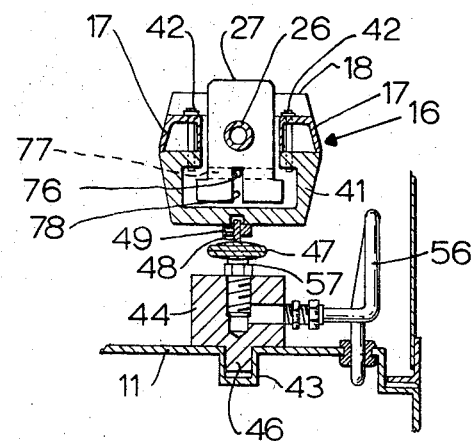
FIG. 4
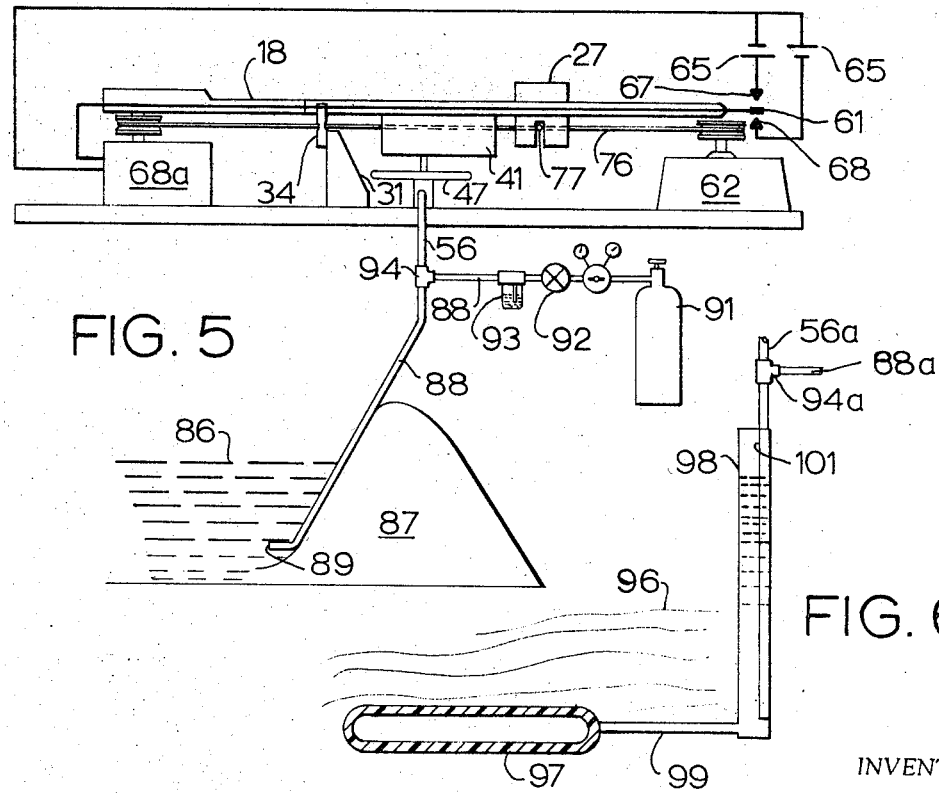
FIG. 5
FIG. 6
INVENTOR.
EUGENE A. GLASSEY
BY
ATTORNEY United States Patent Office 3,555,903
Patented Jan. 19, 1971

3,555,903
INSTRUMENT FOR GAUGING LIQUID DEPTH, AND THE LIKE
Eugene A. Glassey, Camarillo, Calif. (% Exactel Instrument Co., Division of Statham Instruments, Inc., 2230 Statham Blvd., Oxnard, Calif. 93030)
Continuation-in-part of application Ser. No. 615,716, Feb. 13, 1967. This application Aug. 4, 1969 Ser. No. 847,344
Int. Cl. G01f 23/14
U.S. Cl. 73—302
7 Claims

ABSTRACT OF THE DISCLOSURE

An instrument to gauge liquid depth and quantity and the weight of snow pack by purge bubble principle or other means. Pressure, which is a function of the depth, quantity or weight, is applied to a bellows which in turn is applied to a beam balance. The poise of the balance is driven along the beam by a reversible electric motor and a wire running over pulleys located adjacent the beam. The motor is energized by electrical contacts associated with the beam.

---

Figure 1:
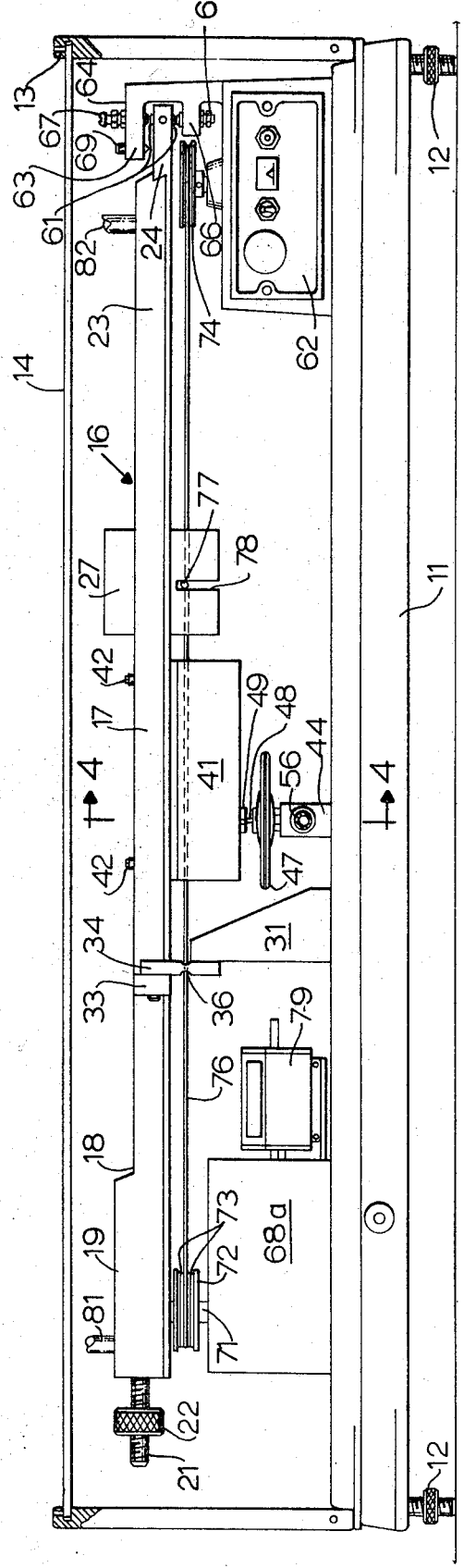

This invention is a continuation-in-part of co-pending application Ser. No. 615,716, filed Feb. 13, 1967, now Pat. 3,475,959.

This invention relates to a new and improved instrument for gauging liquid depth and quantity and has particular application in hydrogical, precipitation, snow and tank content measurement. A beam balance is provided. A force is applied to the balance tending to tilt the beam in one direction, which force is proportional to the depth, etc., being measured. The force is counterbalanced by a movable poise whose position thus measures the depth, etc.

A principal object of the present invention is to provide an instrument which is adapted to a wide variety of different installations. Means is provided to adjust the point of pressure application along the length of the beam so that the poise of the beam will bring the beam to balance whether the pressure being balanced is great or small. Accordingly, the present invention is adapted to, and capable of, adjustment for a wide range of pressures.

Still another feature of the invention is the facility with which the pressure application point may be changed and reset.

Another feature of the invention is the provision of means to calibrate the instrument. It would be understood that bellows of the type hereinafter described tend to vary in effective area and other characteristics. A comprehensive field proving capability is afforded in this instrument permitting adjustment of the pressure application point when a proper reading of the instrument is not attained at one adjustment position.

Still another feature of the invention is the fact that the instrument is light and portable, which is of importance when it must be installed at geographically remote locations.

Still another feature of the invention is the fact that it operates with a low power consumption, which is particularly important where the instrument is located at a distance from power lines and must rely upon battery power for its operation. Another feature of the invention is the fact that the instrument operates on zero power at balance.

Another important feature of the invention is the fact that the error due to temperature variation is very low. This is of great importance where there are extreme seasonal temperature variations.

Another feature of the invention is the high torque output shaft which is used to actuate data acquisition and telemetry equipment.

Another feature of the invention is the fact that it has a high order of accuracy and a high order of precision or sensitivity.

Another feature of the invnetion is the fact that the power transmission for moving the poise along the beam is not located on the beam and thus the weight of the beam is reduced.

Still another feature of the invention is the fact that it is adapted to a wide variety of uses. A principal use of the invention is in connection with purge bubble principle measurement of liquid depths. The pressure in the purge bubble gas line may be transmitted to the bellows which applies a force to the beam which ic counterbalanced by the position of the poise. Means is provided to bring the beam into balance by moving the poise. Thus, an effective measurement of liquid height is achieved. It will be understood that the purge bubble principle is adapted to a wide variety of different installations and that the present invention may be incorporated in all such installations.

A primary application of the invention is for river and stream depth gauging along stream beds. In the accompanying drawings, the apparatus is shown measuring water heights behind dams, for facility in illustration. However, more common usages would be in stream, rain and tank gauging for which accuracy of 0.01 or 0.02 feet over a fairly narrow span of e.g. 60 foot maximum is adequate and is readily achieved by use of this invention.

When used in depth gauging, as in tanks, the invention lends itself well to use with liquids which are difficult, such as those at high temperature, liquefied gases and chemically active materials.

One of the features of the invention is the fact that it provides an accurate, high capacity gauging instrument but one which is mechanically not complex, and hence is easily transportable and does not require frequent maintenance. The construction also lends itself to a modest size dust and weather-tight enclosure.

A further feature of the invention is its application to plastic pillow techniques for measuring the weight of snow pack and other objects. The pillow is filled with liquid and connected by a tube to a column of liquid the height of which is proportional to the weight imposed on the pillow. A piezometer line is run to the bottom of the column and the pressure in the line is proportional to said weight. Such pressure is measured by the instrument hereinafter described. More accurate and convenient means for measuring snow pack weights is thus provided.

Other objects of the present invention will become apparent upon reading the following specification and referring to the accompanying drawings in which similar characters of reference represent corresponding parts in each of the several views.

Figure 2:
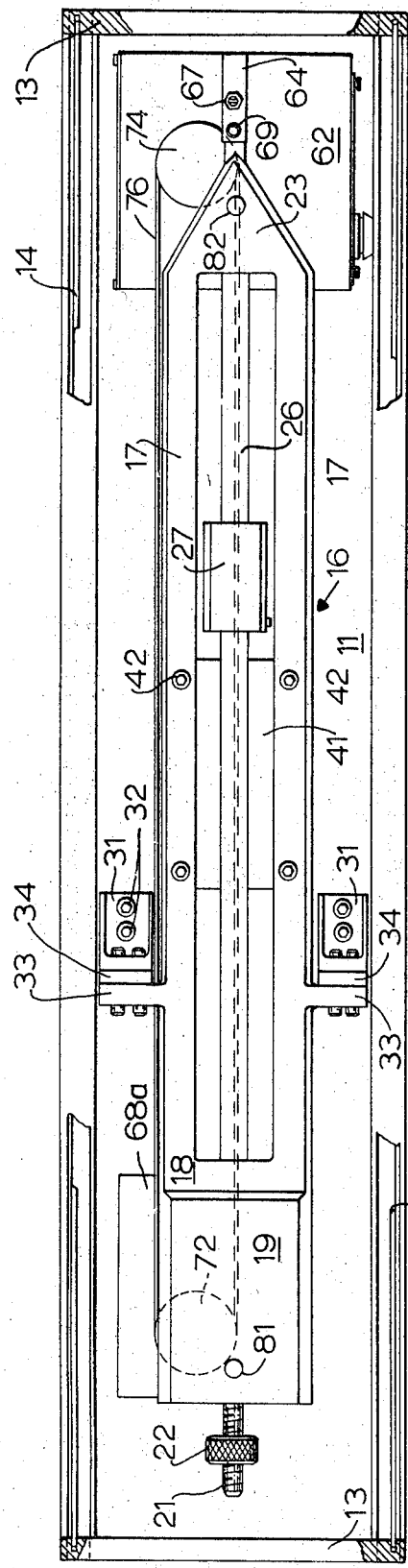

In the drawings:
FIG. 1 is a front elevation of an instrument in accordance with the present invention partly broken away to reveal interior construction.
FIG. 2 is a top plan of the structure of FIG. 1 and likewise partially broken away.
FIG. 3 is an end elevation view from the right of FIG. 4.
FIG. 4 is a transverse vertical section view taken substantially along the line 4—4 of FIG. 1.
FIGS. 5 and 6 are schematic views showing installations in which the instrument may be used.

The instrument herein illustrated is provided with a base 11 having adjustable legs 12 so that the base 11 is maintained level. A dust-proof cover 13 preferably having a curved transparent panel 14 affording view of the top and both sides of the apparatus rests upon the base and encloses the balance mechanism hereinafter described.

Extending longitudinally of base 11 is a beam 16 which consists of horizontally spaced apart side members 17 which are joined together at the left-hand end by an end member 18 to which is attached a pan 19. Beyond pan 19 is a threaded shaft 21 carrying an adjustable tare poise 22. The right-hand end of balance 16 is formed with a triangular shaped pan 23 from which projects a pointer 24. Extending between side members 17 and supported at either end by pans 19, 23, is a horizontal, smooth tube 26 along which poise 27 slides.

Beam 16 is mounted above base 11 by means of a pair of L-shaped brackets 31 fixed to base 11 by screws 32. Side members 17 adjacent brackets 31 carry laterally projecting lugs 33 which are located at a higher elevation than brackets 31. Inter-connecting lugs 33 and brackets 31 at front and back of the instrument are flex strips 34. Strips 34 are bolted at their upper ends to lugs 33 and at their lower end to brackets 31. It is characteristic of strips 34 that they flex about their reduced thickness portions 36. The mounting of beam 16 permits the beam to tilt in a vertical plane, with a horizontal line through reduced thickness portions 36 as a fulcrum axis.

Depending from beam 16 is a channel shaped yoke 41 which is adjustably positioned along the length of beam 16 by means of screws 42 passing thorugh sides 17. Longitudinally slidable in a groove forming depression 43 in the top of base 11 is a block 44 having a depending foot 46 which fits into depression 43. Mounted above block 44 is a bellows 47 having an upward projecting pin 48 carrying a fitting 49 slidably adjustable along the length of pin 48 which in turn bears against the underside of yoke 41 and thus transmits movement of pin 48 to beam 16 dependent upon the pressure applied to bellows 47. The underside of yoke 41 has a longitudinal groove 49 to accommodate pin 48. The lower end of bellows 47 is connected by tubing connection 51 to block 44. A flexible tube 56 is likewise connected to block 44 and transmits the pressure to be measured to bellows 47. It will be observed that the block 44 may be moved lengthwise of the base 11 and that the yoke 41 may be slid along the beam 16 to vary the distance from fulcrum point 36 at which the force of the pressure in tube 56 is applied to beam 16. The poise 27 is generally of constant weight, whereas the pressure transmitted through tube 56 may be of a range of pressures depending upon the installation of the instrument. Hence by adjusting the point at which the pressure from the bellows 47 is transmitted to the beam 16, the instrument is capable of operation over a wide range of pressures.

Pointer 24 carries electrical contacts 61 on its top and bottom surfaces. Mounted on the right-hand end of base 11 is an electrical control box 62 and on top thereof is a vertical arm 63 having top and bottom horizontal extensions 64 and 66 respectively. Electrical contacts 67, 68 on extensions 64, 66 and which are connected to reversed polarity batteries 65 are engaged by contacts 61 as the beam 16 tilts and thus energize in opposite directions reversible servo motor 68a which is connected to batteries 65 and contacts 61.

During transportation, to prevent displacement of beam 16, a hold down screw 69 threaded into extension 64 engages pointer 23 and forces lower contact 61 against contact 68, preventing beam 16 from moving.

Motor 68a has a gear reduction turning output shaft 71 on which pulley 72 having a plurality of grooves 73 therein is mounted. Idler pulley 74 is rotatably mounted on top of control box 62. Continuous wire 76 passes around both pulleys. Pin 77 is attached to wire 76 and fits into slot 78 in poise 27. Thus, as motor 68 turns, poise 27 is moved longitudinally along tube 26. When contacts 61 engage neither contact 67 nor contact 68, the poise 27 is in balance and motor 68 is de-energized. Also, driven through a gear train (not shown) by motor 68 is a counter 79 which provides a reading for the position of poise 27. It will be understood that when the position of bellows 47 is adjusted, change gears for counter 79 should be provided.

Pans 19 and 23 carry upward extending vertical rods 81, 82 respectively. Annular weights (not shown) fit onto rods 81, 82. By using such weights, the instrument may be tested in the field and such testing is comprehensive in that it includes the characteristics of bellows 47. It will be understood that the manufacturing techniques for such bellows are not perfected to the extent that they are inter-changeable, since their effective area and other variables are different. Accordingly, a known pressure is applied to tube 56. A weight is placed on rod 82 or rod 81. Such weight should cause the poise 27 to move a precalculated distance along beam 16. If the poise moves a distance which differs from that which has been precalculated, then the position of bellows 47 is moved until the poise is in proper position.

Application of weights to rods 81, 82 enables the user to verify the accuracy of the balance, the pressure measurement, and even the weights themselves. With zero pressure at bellows 47, the beam should balance with weights on the rods proportional to the distances between the rods and fulcrum 36. By changing the relative distances and using the same weights in the same locations, the accuracy of the balance may be vertified. By transferring weights from right to left rods (and vice-versa) the accuracy of the weights may be checked.

By applying an arbitrary pressure in bellows 47 and known weights on the rods, the accuracy of position of the poise 27 may be checked. The weights themselves may be checked in multiples of a given mass.

A typical installation, illustrated schematically in FIG. 5, for the instrument which has heretofore been described is measuring the height of liquid 86 behind a dam 87. A thin tube piezometer line 88 extends down to adjacent the base of dam 87 and has an outlet 89. The upper end of tube 88 is connected to a cylinder 91 of compressed gas such as nitrogen. Gas from tank 91 passes through a throttling valve 92 and a bubble chamber 93 and thence into tube 88. Valve 92 is adjusted so that bubbles of gas pass through the liquid in chamber 93 at a slow rate such as about six per minute thereby permitting inspection to insure that the gas is passing through to tube 88 and out outlet 89. The pressure of the gas in tube 88 is dependent upon the height of the liquid 86. The pressure in tube 88 is transmitted to the instrument through a T 94 to which tube 56 is connected.

Directing attention to FIG. 6, another installation in which the invention may be employed is illustrated as a typical example. It is a common means of measuring the weight of a snow pack 96 to use a plastic pillow 97 filled with liquid. The weight of the pack causes the pressure of the liquid within pillow 97 to increase. In accordance with the present invention, an elongated vertical tube 98 is connected at its bottom to a small diameter tube 99 connected to pillow 97. The purge bubble principle is used to measure the height of liquid in tube 98 and thus to measure the height of pack 96. Accordingly, piezometer line 101 is installed inside column 98 running from the top thereof to a point adjacent the bottom. Line 101 is connected into purge bubble apparatus and the instrument heretofore described in a manner similar to the manner in which tube 88 is connected into such equipment as illustrated in FIG. 5 and hereinabove explained. Accordingly, a detailed description of the installation is not believed necessary, corresponding parts being designated by the same reference numerals followed by subscript a.

What is claimed is:

1. An instrument of the character described comprising a base, a beam, support means supporting said beam on said base for tilting movement about a fulcrum axis, block means on said beam, support means adjustably mounted on said base for movement parallel to said beam, said support means having pressure-responsive means engageable with said block means operable at a plurality of positions at varying distances from said fulcrum axis to apply a force to said beam tending to tip said beam about said fulcrum axis in a first direction, a poise movable along said beam and tending to tilt said beam in a direction opposite said first direction, a reversible motor, mechanical means driven by said motor to move said poise along said beam, a first electrical contact movable with said beam, second and third electrical contacts engaged by said first contact when said beam tilts up or down, respectively, a source of electric current connected to each of said contacts and to said motor to turn said motor to move said poise to bring said beam into balance, and readout means driven by said motor proportional to movement of said poise to indicate the pressure applied to said pressure-responsive means.

2. An instrument according to claim 1, in which said pressure responsive means comprises a bellows connected at one end to a source of pressure and having a fitting at its opposite end bearing against said block means.

3. An instrument according to claim 2, in which said block means comprises an elongated yoke suspended from said beam, said base formed with a groove parallel to and below said beam, said support means comprising a block having a foot slidable in said groove, said bellows positioned on top of said block, said fitting engaging the underside of said yoke at any desired position along the length of said yoke.

4. An instrument according to claim 1, in which said beam comprises a first end member on one side of said support member, a second end member on the opposite side of said support member, a pair of side members extending between said end members, a tube disposed between said side members and extending between said end members, said poise slidable along said tube, a pair of lugs extending laterally from said side members, and flex strips fixed to said lugs and to said support means.

5. An instrument according to claim 1, which further comprises at least one vertical rod projecting up from said beam remote from said fulcrum axis and annular weights adapted to fit on said rod to check the adjustment of the position of said support means relative to said block means.

6. A system for measuring liquid depth comprising an instrument according to claim 1, a first tube having an outlet adjacent the bottom of a body of liquid to be gauged, a second tube in pressure communication with said first tube remote from said bottom, pressure regulating means for applying pressure to said second tube to balance the pressure in said first tube, said pressure-responsive means in pressure communication with said second tube.

7. A system for measuring weight comprising an instrument according to claim 1, a flexible pillow, a vertical column, a conduit connecting said pillow to the bottom of said column, liquid filling said pillow and conduit and standing in said column, the height of liquid in said column proportional to the weight of matter resting on said pillow, a first tube having an outlet adjacent the bottom of said column, a second tube in pressure communication with said first tube, pressure regulating means for applying pressure to said second tube to balance the pressure in said first tube, said pressure-responsive means in pressure communication with said second tube.

References Cited
UNITED STATES PATENTS

| | | | |
|---|---|---|---|
| 1,258,268 | 3/1918 | Sorge, Jr. | 73—296X |
| 1,579,415 | 4/1926 | Thomas | 73—296X |

LOUIS R. PRINCE, Primary Examiner

W. A. HENRY, Assistant Examiner

U.S. Cl. X.R.

73—410